(12) United States Patent
Aoki et al.

(10) Patent No.: US 10,190,869 B2
(45) Date of Patent: Jan. 29, 2019

(54) INFORMATION PROCESSING DEVICE AND INFORMATION PROCESSING METHOD

(71) Applicant: SONY CORPORATION, Tokyo (JP)

(72) Inventors: Suguru Aoki, Tokyo (JP); Sho Murakoshi, Tokyo (JP); Ryo Mukaiyama, Tokyo (JP); Yoshihiro Nakanishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/520,073

(22) PCT Filed: Sep. 25, 2015

(86) PCT No.: PCT/JP2015/077216
§ 371 (c)(1),
(2) Date: Apr. 18, 2017

(87) PCT Pub. No.: WO2016/088437
PCT Pub. Date: Jun. 9, 2016

(65) Prior Publication Data
US 2017/0322017 A1   Nov. 9, 2017

(30) Foreign Application Priority Data
Dec. 4, 2014 (JP) ................. 2014-245901

(51) Int. Cl.
*G01B 11/03* (2006.01)
*G01B 11/00* (2006.01)
*H04N 5/232* (2006.01)
*G06T 11/60* (2006.01)
*H04N 5/247* (2006.01)

(52) U.S. Cl.
CPC .............. *G01B 11/03* (2013.01); *G01B 11/00* (2013.01); *G06T 11/60* (2013.01); *H04N 5/232* (2013.01); *H04N 5/23206* (2013.01); *H04N 5/23219* (2013.01); *H04N 5/247* (2013.01)

(58) Field of Classification Search
CPC .......... G01B 11/03; G06T 11/60; H04N 5/232
USPC ....................................................... 382/103
See application file for complete search history.

(56) References Cited

U.S. PATENT DOCUMENTS

2005/0046626 A1 * 3/2005 Yoda .................. G06T 15/30
345/419

FOREIGN PATENT DOCUMENTS

| JP | 2003-179800 A | 6/2003 |
| JP | 2005-100367 A | 4/2005 |
| JP | 2005-109757 A | 4/2005 |
| JP | 2007-235399 A | 9/2007 |
| JP | 2010-081260 A | 4/2010 |

* cited by examiner

*Primary Examiner* — Amandeep Saini
(74) *Attorney, Agent, or Firm* — Chip Law Group

(57) ABSTRACT

Provided is an information processing device including a processor configured to achieve a function of collecting information indicating visual target positions from a plurality of viewpoints existing in a space, and a function of evaluating positions in the space in accordance with density of the visual target positions.

17 Claims, 7 Drawing Sheets

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/077216 filed on Sep. 25, 2015, which claims priority benefit of Japanese Patent Application No. JP 2014-245901 filed in the Japan Patent Office on Dec. 4, 2014. Each of the above-referenced applications is hereby incorporated herein by reference in its entirety.

TECHNICAL FIELD

The present disclosure relates to information processing devices, information processing methods, and programs.

BACKGROUND ART

Various technologies for obtaining expressive images when capturing images with a camera have been proposed, such as capturing images with a plurality of cameras having different viewpoints. Patent Literature 1 is an example of such technologies.

CITATION LIST

Patent Literature

Patent Literature 1: JP 2003-179800A

DISCLOSURE OF INVENTION

Technical Problem

For example, according to the technology described in Patent Literature 1, expressive images are generated by combining images of a certain position in a space that have been captured by a plurality of cameras. In this case, even if the image is generated appropriately, the user cannot obtain attractive image without selecting an appropriate target position. The same applies to another technology. To obtain expressive and attractive image for a user, it is important to appropriately decide a target position in the space. However, such technologies of appropriately deciding the position have not been proposed sufficiently.

Accordingly, the present disclosure proposes a novel and improved information processing device, information processing method, and program that are capable of appropriately deciding an image generation target position in a space.

Solution to Problem

According to the present disclosure, there is provided an information processing device including a processor configured to achieve a function of collecting information indicating visual target positions from a plurality of viewpoints existing in a space, and a function of evaluating positions in the space in accordance with density of the visual target positions.

In addition, according to the present disclosure, there is provided an information processing method including collecting information indicating visual target positions from a plurality of viewpoints existing in a space, and evaluating, by a processor, positions in the space in accordance with density of the visual target positions.

In addition, according to the present disclosure, there is provided a program causing a processor to achieve: a function of collecting information indicating visual target positions from a plurality of viewpoints existing in a space; and a function of evaluating positions in the space in accordance with density of the visual target positions.

Advantageous Effects of Invention

As described above, according to the present disclosure, it is possible to appropriately decide an image generation target position in a space.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
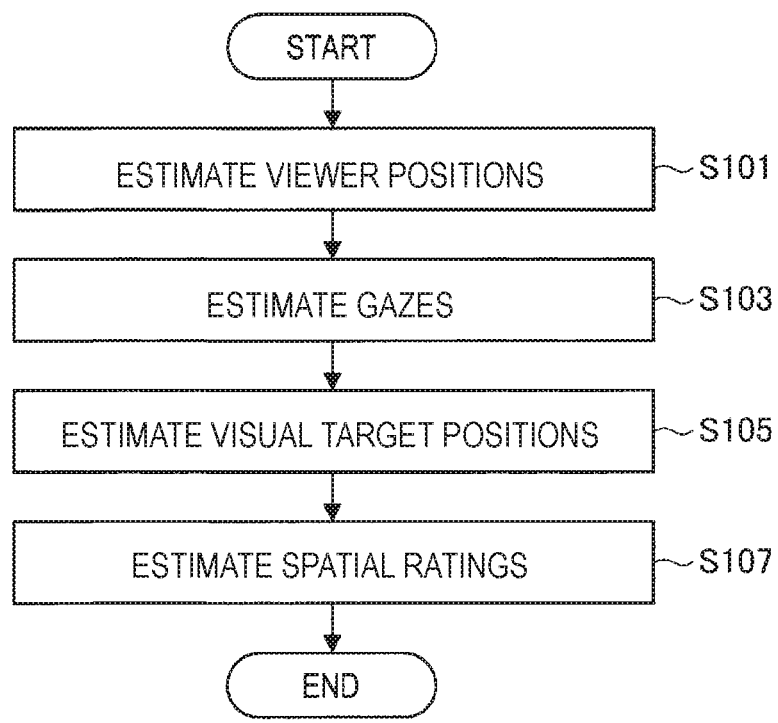
FIG. 1 is a flowchart schematically illustrating a process of spatial rating estimation according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is given in the following order.
1. Spatial rating estimation
2. Image collection and free-viewpoint-image generation
3. System configuration example
4. Process workflow example 5. Hardware configuration
6. Supplement (1. Spatial Rating Estimation)

According to an embodiment of the present disclosure, spatial ratings are estimated on the basis of density of visual target positions from a plurality of viewpoints existing in a space. The spatial ratings represent how much attention each position in a space is attracting. For example, in the case of a space such as a sports stadium, the plurality of viewpoint may include viewpoints of an audience in the sports stadium. In addition, for example, the plurality of viewpoints may include viewpoints of cameras installed in the sports stadium. For example, visual target positions from such viewpoints are gaze positions. A position on which gazes of the audience and the cameras are concentrated, that is, the position with high spatial ratings may be estimated to be attracting much attention in the sports stadium. According to the embodiment, three-dimensional point cloud data is generated on the basis of such spatial ratings so as to provide a free-viewpoint image. In the present specification, the images include moving images (video) and still images.

FIG. 1 is a flowchart schematically illustrating a process of spatial rating estimation according to an embodiment of the present disclosure. With reference to FIG. 1, first, viewer positions are estimated (S101) according to the embodiment. As used herein, the term "viewer" means a subject whose viewpoint is in a space, such as the audience or the camera. The viewer positions are estimated by performing self-location estimation on the basis of viewpoint images provided by the viewers, for example. Technologies such as simultaneous localization and mapping (SLAM) may be used for the self-location estimation based on images. In the self-location estimation, information of a landmark in the space, information of a three-dimensional model of the space, or the like may be used. Alternatively, the viewer positions may be estimated on the basis of information provided by the viewers themselves. In this case, for example, positioning using radio waves from a base station such as Global Navigation Satellite System (GNSS) or Wi-Fi, or position indication that is specific for a space (for example, location of audience seat in sports stadium indicated by ticket information) may be used.

Next, gaze estimation is performed (S103). According to a simple method, a central direction of a viewpoint image provided by a viewer may be considered as a gaze direction. For example, more precise viewpoint estimation is possible in the case where the viewer is an audience wearing a wearable camera. In this case, for example, an image of eyes captured with an inward-facing camera that is provided in addition to a viewpoint image captured by the audience with an outward-facing camera is used. More specifically, it is possible to estimate a gaze from central positions of pupils, and it is also possible to estimate a gaze from an attitude of an eyeball model.

Next, visual target positions of the viewers are estimated (S105) on the basis of the viewer positions estimated in S101 and the gazes estimated in S103. For example, the visual target position is specified as a position on a gaze from the viewer position. For example, a position at which the gaze intersects with a ground or a floor is estimated as the visual target position by using the three-dimensional model of the space. Alternatively, in the case of a camera capable of using focal length, it is possible to estimate the visual target position on the gaze on the basis of the focal length. The process until estimating a visual target position in S105 may be performed in a client device corresponding to each viewer, or may be performed in a server that collects data such as images from the client devices, for example.

Next, spatial ratings are estimated on the basis of the visual target positions estimated in S105. As described above, the spatial ratings are estimated on the basis of density of the visual target positions in the space. By this time, a server configured to estimate spatial ratings have collected information indicating a visual target position of each user (in order words, visual target positions from a plurality of viewpoints existing in the space). The spatial ratings may be calculated for each grid obtained by dividing the space into a predetermined size, or may be calculated for each cluster including the visual target positions that are close to each other, for example.

As described above, the spatial ratings estimated through the above described process are used for generating point cloud data for providing a free-viewpoint image. More specifically, for example, the point cloud data is generated with regard to a position whose spatial rating (density of visual target positions) exceeds a threshold. In addition to the method using point cloud data, there are many methods for providing a free-viewpoint image. The data for providing a free-viewpoint image through such a method may be generated on the basis of spatial ratings. For example, JP 2007-133660A describes a technology for providing a free-viewpoint image.

By using the free-viewpoint image, it is possible to observe any position in a space from any angle. However, for example, in the case where the free-viewpoint image is provided without pinpointing a position, a user who views a captured image ex-post facto cannot decide which position to look at. Therefore, the user does not always gain better experience. In addition, vast amounts of data are necessary when providing a free-viewpoint image by using all the available images. Therefore, according to the embodiment, a target position to which a free-viewpoint image is provided is limited on the basis of spatial ratings. Thereby, it is possible to provide a user-friendly free-viewpoint image and prevent data for providing the free-viewpoint image from becoming unnecessarily too much.

Figure 2:
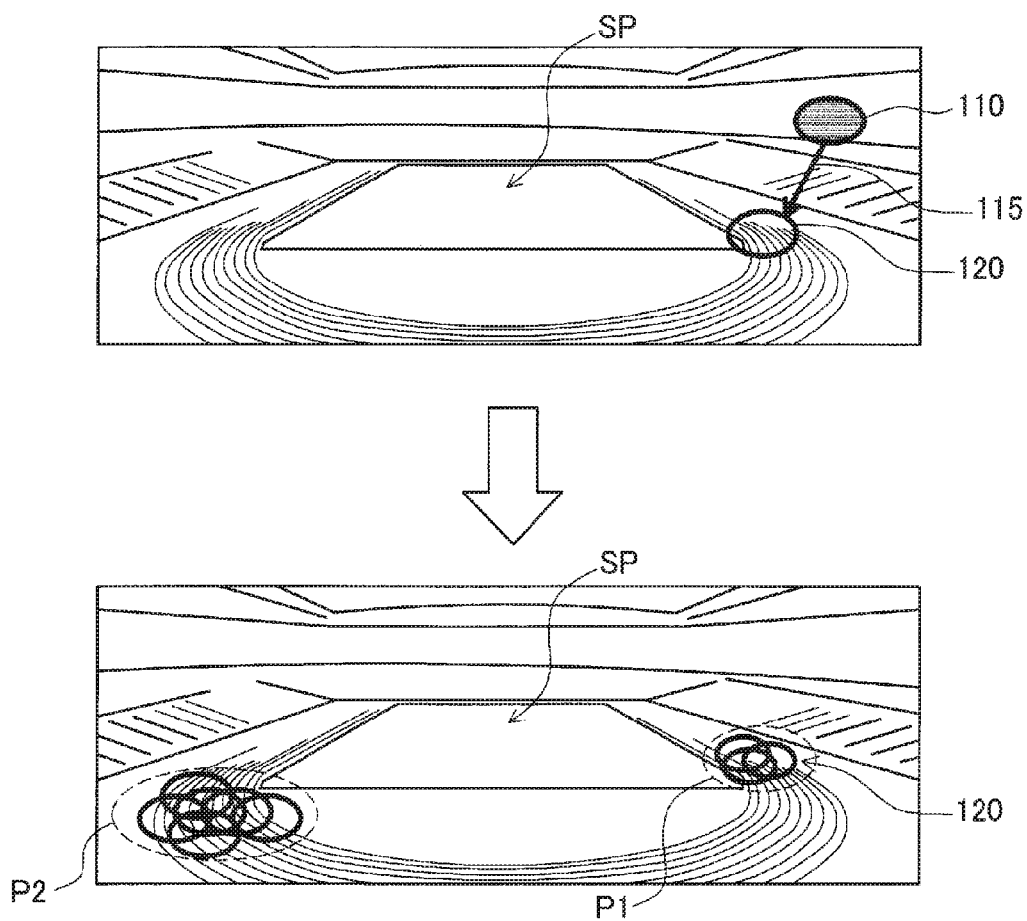
FIG. 2 is a diagram schematically illustrating spatial rating estimation according to an embodiment of the present disclosure.

FIG. 2 is a diagram schematically illustrating spatial rating estimation according to an embodiment of the present disclosure. As illustrated in FIG. 2, according to the embodiment, a viewer position 110 in a space SP (sports stadium in the illustrated example) is first estimated. As described above, the viewer position 110 may be a position of a camera or an audience to whom a viewpoint image is provided. Next, a gaze 115 is estimated. For example, the gaze 115 may be considered as going along a central direction of a viewpoint image, or may be detected by using a gaze detection technology in the case where the viewer is an audience. On the basis of a result of estimating the gaze 115, a visual target position 120 in the space SP is estimated. Like the illustrated example, the visual target position 120 may be estimated as a position at which the gaze 115 intersects with a ground (or floor). The spatial ratings are estimated in accordance with density of the visual target positions 120. In the illustrated example, relatively high spatial ratings are estimated at a position P1 and a position P2 in which visual target positions 120 are concentrated.

Figure 3:
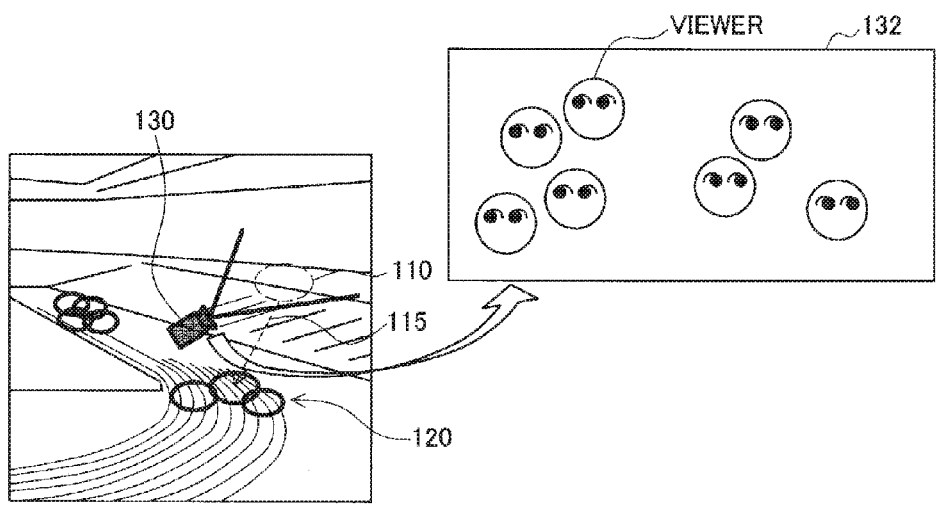
FIG. 3 is a diagram illustrating another example of visual target position estimation according to an embodiment of the present disclosure.

FIG. 3 is a diagram illustrating another example of visual target position estimation according to an embodiment of the present disclosure. In the above described example, the visual target position is estimated on the basis of the viewpoint image provided by the viewer. However, in the example illustrated in FIG. 3, the viewer position 110 and the gaze 115 are estimated on the basis of an image 132 captured by an environmental camera 130. The image 132 is different from the viewpoint image. The image 132 includes viewers (audience) as subjects. The gaze 115 may be estimated by analyzing the image 132 and specifying viewer positions and face directions or eyes direction of the viewers in the image. For detecting viewers and specifying the face directions or eyes directions, a result of machine learning with regard to the image may be used.

(2. Image Collection and Free-Viewpoint-Image Generation)

Figure 4:
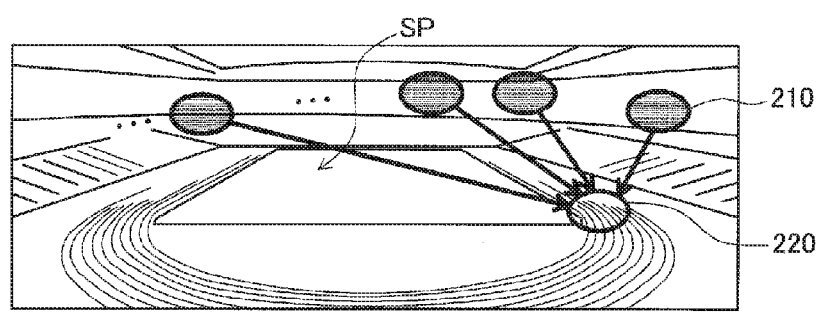
FIG. 4 is a diagram schematically illustrating an example of collecting images according to an embodiment of the present disclosure.

FIG. 4 is a diagram schematically illustrating an example of collecting images according to an embodiment of the present disclosure. As illustrated in FIG. 4, according to the embodiment, images including a position 220 selected on the basis of the spatial ratings are collected to generate the free-viewpoint image, among images captured at respective viewpoints 210 in the space SP (sports stadium in the illustrated example). The viewpoints 210 may be positions of an audience (the audience may be professional photographers) who are wearing wearable cameras or capturing images with mobile cameras (such as usual digital cameras or cameras embedded in smartphones), for example. In addition, the viewpoints 210 may include a position of a fixed camera installed for broadcasting, for example.

As described above, according to the embodiment, the images captured at the viewpoints 210 may be used for estimating spatial ratings, for example. The images may be used for generating a free-viewpoint image without any change. Since images from more viewpoints 210 can be obtained at the position 220 with high spatial ratings, it is easy to obtain sufficient amount of images for generating the free-viewpoint image at the position 220 with high spatial ratings. Alternatively, all the available images may be collected regardless of whether the images have been used for estimating the spatial ratings, and then images including the position 220 with high spatial ratings may be selected. For example, as illustrated in FIG. 3, in the case where the visual target position is estimated by using an image other than a viewpoint image, images including the position 220 with high spatial ratings estimated on the basis of density of the visual target positions may be selected ex-post facto from viewpoint images that have been separately collected.

Figure 5:
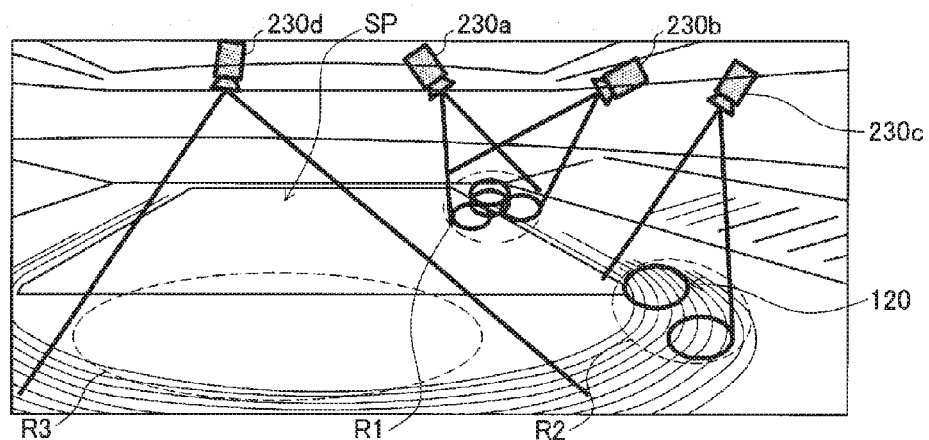
FIG. 5 is a diagram schematically illustrating another example of collecting images according to an embodiment of the present disclosure.

FIG. 5 is a diagram schematically illustrating another example of collecting images according to an embodiment of the present disclosure. In the example illustrated in FIG. 5, the environmental cameras 230 collect images including the position 220 with high spatial ratings. The environmental cameras 230 may be controlled in real time on the basis of a result of estimating the spatial ratings. In this case, for example, the environmental cameras 230 are installed in a manner that the environmental cameras 230 can change their orientation in a predetermined range. Image capturing regions of the respective environmental cameras 230 are partly overlapping with each other in the space SP.

In the illustrated example, the plurality of environmental cameras 230a and 230b capture an image of a region R1 with high resolution (by zooming in). The region R1 has been estimated as a region with high spatial ratings in which many visual target positions 120 are concentrated. In addition, the single environmental camera 230c captures an image of a region R2 with high resolution (by zooming in). The region R2 has been estimated as a region with medium spatial ratings in which some visual target positions 120 are spread. In addition, the single environmental camera 230d captures an image of a region R3 with low resolution (by zooming out). The region R3 has been estimated as a region with low spatial ratings which includes no visual target position 120.

According to the example illustrated in FIG. 5, although cost is necessary for installing the environmental cameras 230, it is possible to stably obtain images with desired quality for generating a free-viewpoint image. The relation between the spatial ratings and operation of the environmental cameras 230 is not limited to the above described example. For example, at least two environmental cameras 230 may capture images of a region that has been estimated as a region with low spatial ratings, in the case where a notable event may suddenly occur in the region. On the other hand, in the case where there is no possibility of such an event, images of the region that has been estimated as the region with low spatial ratings do not have to be captured.

Figure 6:
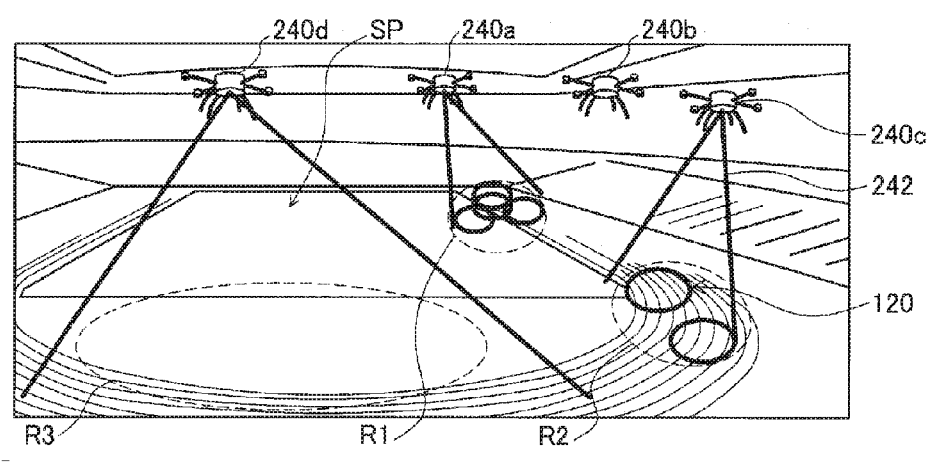
FIG. 6 is a diagram schematically illustrating still another example of collecting images according to an embodiment of the present disclosure.
Figure 7:
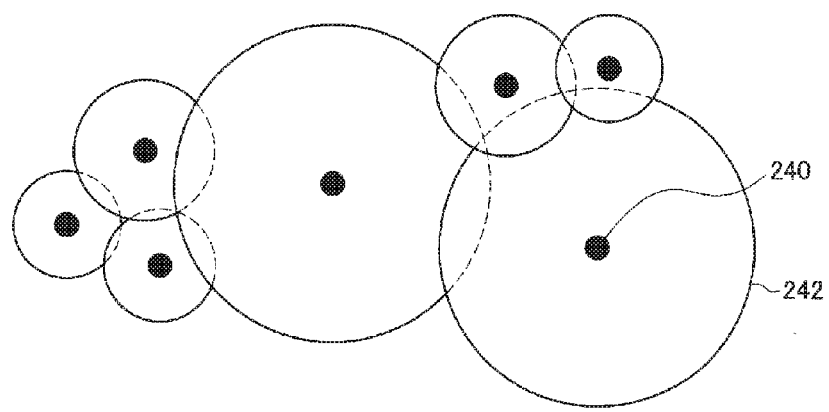
FIG. 7 is a diagram schematically illustrating still another example of collecting images according to an embodiment of the present disclosure.

FIG. 6 and FIG. 7 are each a diagram schematically illustrating still another example of collecting images according to an embodiment of the present disclosure. In the example illustrated in FIG. 6 and FIG. 7, unmanned aerial vehicles (UAVs) for image capturing collect images similar to the example illustrated in FIG. 5. The UAVs 240 flies above the space SP (or in the space SP), and captures images of the space SP. In the example illustrated in FIG. 6, the UAVs 240a and 240b captures images of the region R1, the UAV 240c captures an image of the region R2, and the UAV 240d captures an image of the region R3.

In a way similar to the environmental cameras 230 illustrated in FIG. 5, the UAVs 240 can change image capturing directions, and perform zooming in/out, for example. In addition, the UAVs 240 can freely move in or above the space SP. Therefore, it is possible to cause more UAV 240 to gather at a position or in a region estimated as a position or a region with high spatial ratings, and to capture images of the position or the region. For example, according to the example illustrated in FIG. 7, it is possible to adjust placement of the UAVs 240 by changing positions of the UAVs 240 in accordance with the spatial ratings so that image capturing ranges 242 of the respective UAVs 240 covers the whole of the space SP.

(3. System Configuration Example)

Figure 8:
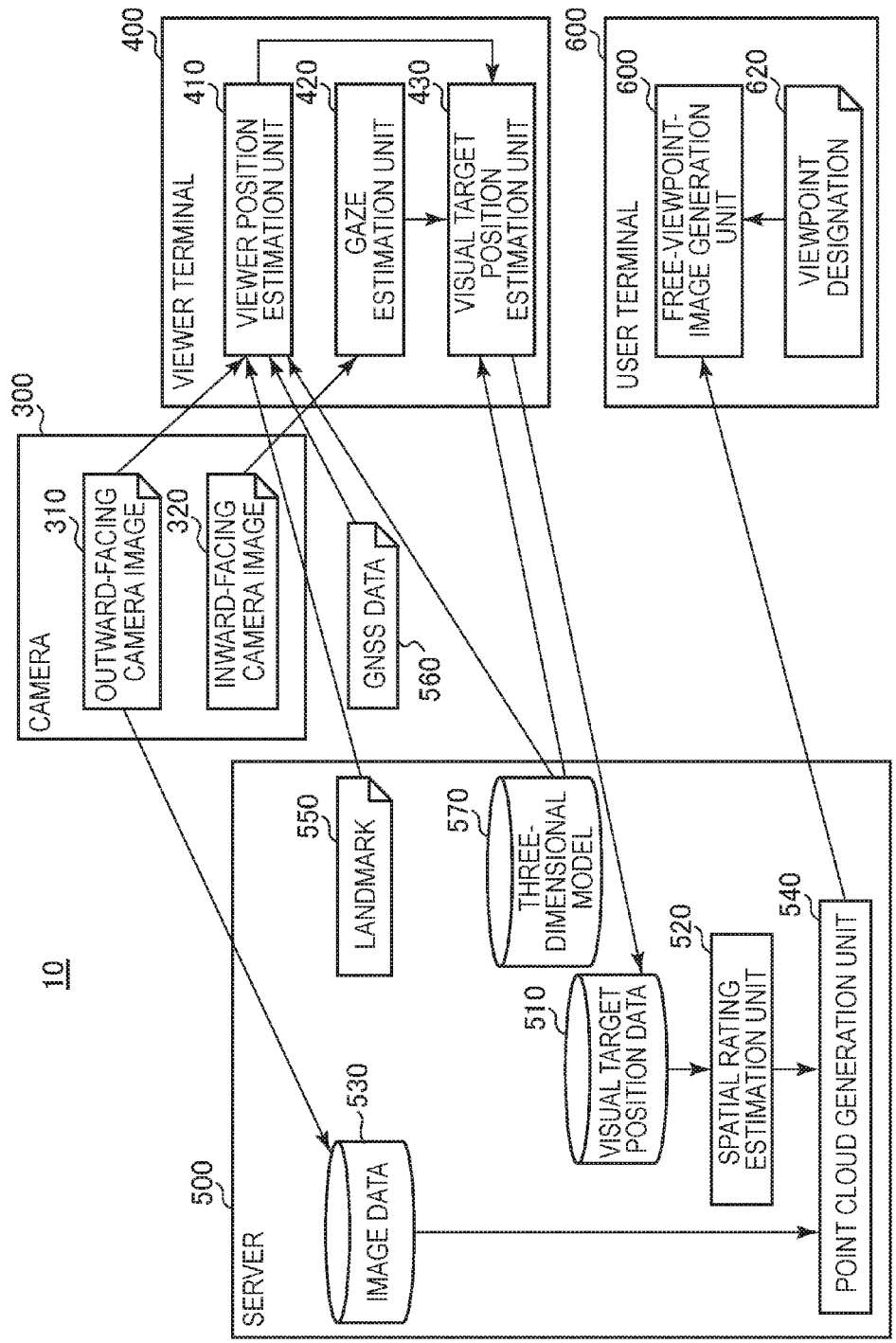
FIG. 8 is a diagram illustrating a configuration example of a system according to an embodiment of the present disclosure.

FIG. 8 is a diagram illustrating a configuration example of a system according to an embodiment of the present disclosure. With reference to FIG. 8, a system 10 includes a camera 300, a viewer terminal 400, a server 500, and a user terminal 600. In the present specification, the term "viewer" means a subject whose viewpoint is in a space, and the term "user" means a subject viewing a free-viewpoint image provided on the basis of spatial ratings that have been estimated in accordance with density of visual target positions of viewers. Hereinafter, the respective The camera 300 is embedded in a terminal configured to be worn or carried by a viewer (the terminal may be the viewer terminal 400), for example. Alternatively, the camera 300 may be something that automatically captures images, in other words, the viewer himself/herself in this specification. The camera 300 includes at least one imaging unit including an image sensor, and the camera 300 acquires an outward-facing camera image 310. In addition, in the case where the camera 300 is embedded in the terminal configured to be worn by the viewer, an inward-facing camera image 320 may be acquired by another imaging unit including an image sensor.

The viewer terminal 400 is a terminal device configured to be used by a viewer in addition to the camera 300, or is the viewer himself/herself. The viewer terminal 400 is implemented by a hardware configuration of an information processing device (to be described later), for example. The viewer terminal 400 may include a viewer position estimation unit 410, a gaze estimation unit 420, and a visual target position estimation unit 430 that are implemented by a processor such as a central processing unit (CPU) operating in accordance with a program stored in memory or a storage. For example, the viewer terminal 400 may be implemented by a smartphone, a digital camera, a tablet, a personal computer, or the like.

For example, the viewer position estimation unit 410 estimates a viewer position by using technologies such as the SLAM on the basis of the outward-facing camera image 310 acquired by the camera 300. At this time, the viewer position estimation unit 410 may use information provided by the server 500, such as a landmark 550 or a three-dimensional model 570. Alternatively, the viewer position estimation unit 410 may estimate a viewer position on the basis of positioning information such as GNSS data 560 or ticket information. In this case, the outward-facing camera image 310 does not always have to be used for estimating the viewer position.

For example, the gaze estimation unit 420 estimates a gaze of a viewer on the basis of the inward-facing camera image 320 acquired by the camera 300. As described above, according to a simple method, a central direction of the outward-facing camera image 310 (that is, viewpoint image) can be considered as a gaze direction. In this case, the gaze estimation unit 420 is not necessary. For example, in the case where the inward-facing camera image 320 can be acquired, it is possible for the gaze estimation unit 420 to estimate a gaze from central positions of pupils, and it is also possible for the gaze estimation unit 420 to estimate a gaze from an attitude of an eyeball model, on the basis of an image of eyes included in the inward-facing camera image 320.

The visual target position estimation unit 430 estimates a visual target position of a viewer on the basis of the viewer position estimated by the viewer position estimation unit 410 and the gaze estimated by the gaze estimation unit 420. For example, the visual target position estimation unit 430 estimates the visual target position on the basis of the three-dimensional model 570 of the space provided by the server 500. The visual target position estimation unit 430 uploads, to the server 500, information indicating the estimated visual target position, such as coordinates in the space defined in the three-dimensional model 570.

The server 500 includes one or a plurality of server devices connected with the camera 300 and/or the viewer terminal 400 via a network. For example, the server device is implemented by a hardware configuration of an information processing device (to be described later). The server 500 may include a spatial rating estimation unit 520 and a point cloud generation unit 540 that are implemented by a processor such as a CPU of the server device operating in accordance with a program stored in memory or a storage. Visual target position data 510, image data 530, and data of the landmark 550 and the three-dimensional model 570 are stored in the memory or the storage in the server device constituting the server 500.

The server 500 collects information of the visual target position provided by the viewer terminal 400, as the visual target position data 510. As described later, it is also possible for the server to estimate the viewer position, the gaze, and/or the visual target position. In any case, the processor of the server device collects information indicating visual target positions from a plurality of viewpoints in the space. The information may be information indicating the estimated visual target position itself as illustrated in the example, may be information indicating the estimated viewer position or the gaze, or may be the outward-facing camera image 310 and/or the inward-facing camera image 320.

The spatial rating estimation unit 520 estimates spatial ratings on the basis of the visual target position data 510. The spatial ratings are an example of an index that is calculated in accordance with density of the visual target positions and that is used for evaluating (rating) positions in the space. Therefore, it can be said that the spatial rating estimation unit 520 evaluates positions in the space in accordance with density of the visual target positions. Here, the server 500 acquires the outward-facing camera image 310 uploaded by the camera 300 and accumulates it as the image data 530. In accordance with the spatial ratings, the point cloud generation unit 540 generates, from the image data 530, point cloud data for providing a free-viewpoint image. The point cloud data is delivered to the user terminal 600.

The point cloud generation unit 540 implemented by the server 500 is an example of a function of editing the image data obtained by capturing image of the space, on the basis of a result of evaluating the points in the space in accordance with the density of the visual target positions. For example, the point cloud generation unit 540 selectively generates the point cloud data for providing the free-viewpoint image in accordance with the spatial ratings that is the index corresponding to the density of the visual target positions. The term "selectively generates" means that the point cloud data is generated with regard to a position or a region with high spatial ratings, and point cloud data is not generated with regard to a position or a region with low spatial ratings, for example.

For example, in the case of the examples illustrated with reference to FIG. 5 to FIG. 7, the processor of the serer device that implements the server 500 may achieves a function of controlling acquisition of the image data obtained by capturing images of the space on the basis of the spatial ratings. In the above described example, the processor of the server device may achieve the function of controlling image capturing performed by the environmental cameras 230 and the UAVs 240. In this case, for example, an image capturing target position in the space may be controlled by changing directions of the environmental cameras 230 or by moving the UAVs 240. In addition, the image capturing target range may be controlled by zooming in/zooming out of the environmental cameras 230 or cameras embedded in the UAVs 240.

The user terminal 600 is a terminal device that is used by a user who views the free-viewpoint image. The user terminal 600 is implemented by a hardware configuration of an information processing device (to be described later), for example. The user terminal 600 may include a free-viewpoint-image generation unit 610 implemented by a processor such as a CPU operating in accordance with a program stored in memory or a storage. For example, the user terminal 600 may be implemented by a television, a recorder, a personal computer, a tablet, a smartphone, or the like.

The free-viewpoint-image generation unit 610 generates a free-viewpoint image on the basis of the point cloud data provided by the server 500. Here, the free-viewpoint image may be generated in accordance with a viewpoint designation 620 that is operation input from a user. The user viewing the free-viewpoint image also can designate zooming in/zooming out by operation input in addition to the viewpoint designation 620. The generated free-viewpoint image may be displayed on a display in the user terminal 600, or may be output to an externally connected display.

The configuration example of the system according to the present embodiment has been described above. The described configuration is a mere example, and various modifications are possible. For example, the functions that have been described as the functions of the viewer terminal 400 and the user terminal 600 may be achieved by the server 500. For example, the system 10 does not have to include the viewer terminal 400 in the case where the camera 300 is configured to upload the outward-facing camera image 310 and the inward-facing camera image 320 to the server 500 and the viewer position estimation unit 410, the gaze estimation unit 420, and the visual target position estimation unit 430 are implemented by the server 500. In addition, the server 500 may function as the free-viewpoint-image generation unit 610, and may deliver the free-viewpoint image generated in accordance with the viewpoint designation 620 to a display device near a user.

(4. Process Workflow Example)

Figure 9:
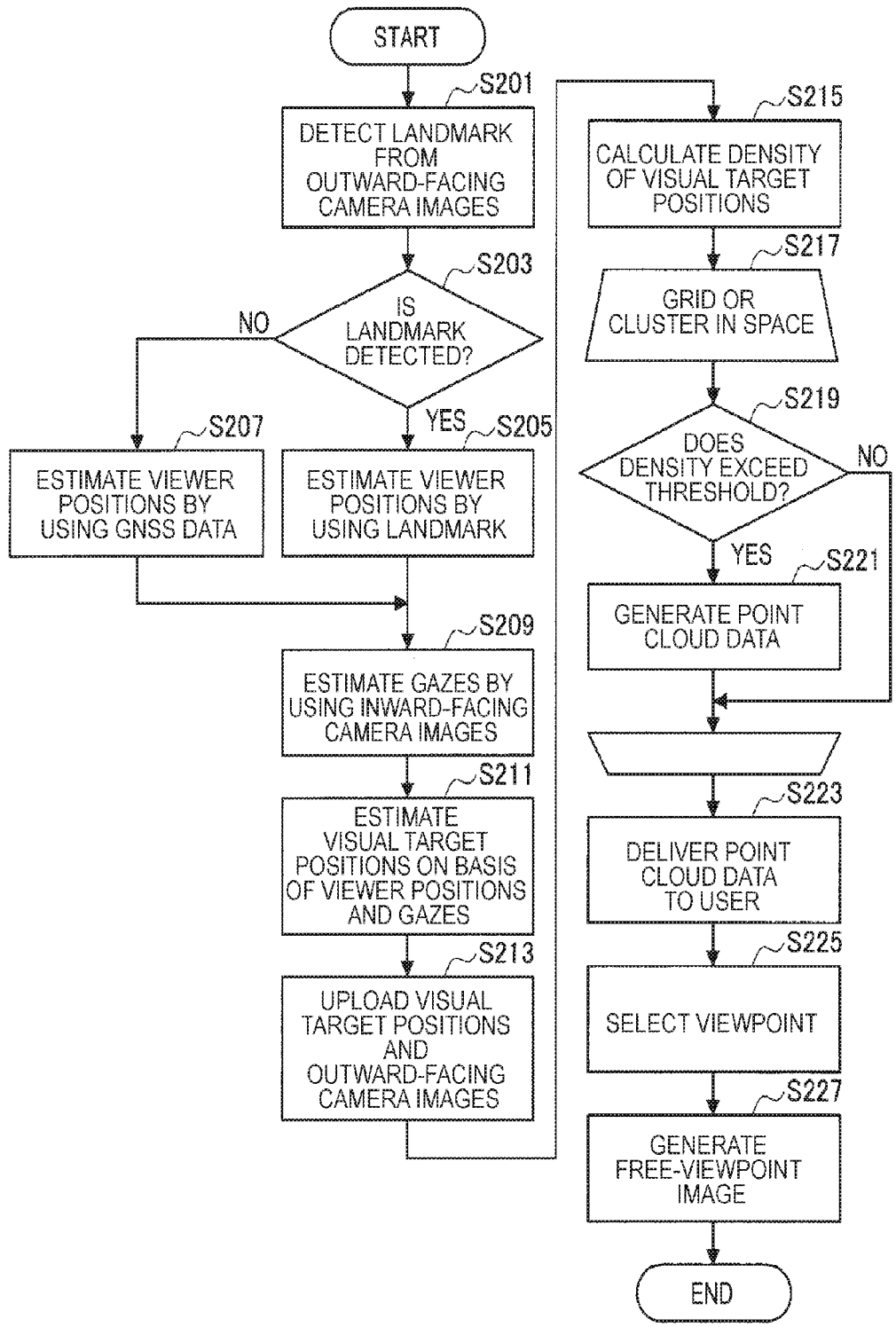
FIG. 9 is a flowchart illustrating an example of a process according to an embodiment of the present disclosure.

FIG. 9 is a flowchart illustrating an example of a process according to an embodiment of the present disclosure. FIG. 9 illustrates an example of a process performed by the system 10 described with reference to FIG. 8.

First, as a process for estimating viewer positions by the viewer terminals 400, a landmark is detected from the outward-facing camera images 310 acquired by the cameras 300 (S201). For example, the landmark is an object in a space that can be a sign in an image. For example, the landmark does not have to be something dedicated to viewer position estimation, and may be a line drawn on a field of a sports stadium, a pole for some sports, a stage in a theater, a signpost, or the like. Alternatively, the landmark may be dedicated to viewer position estimation. In this case, the landmark has a texture that is uniquely recognized, and is installed at a position at which images of the landmark can be easily captured from various viewpoints, for example.

In the case where the landmark is detected when determining whether the landmark is detected from the outward-facing camera images 310 (S203), viewer positions are estimated by using the landmark (S205). In this case, for example, the viewer positions are estimated by using the SLAM technology on the basis of coordinates of the landmark that has been preset in the three-dimensional model of the space. On the other hand, in the case where the landmark is not detected, the viewer positions are estimated by using GNSS data (S207). Instead of the GNSS data, the viewer positions may be estimated on the basis of other positioning information or the like. In the case where the viewer positions can be estimated with sufficient accuracy by using the positioning information or the like, the viewer positions may be estimated preferentially by using the positioning information or the like.

After the viewer position estimation, gazes are estimated by using the inward-facing camera images 320 (S209). For example, in the case where the inward-facing cameras 320 cannot be used, central directions of the outward-facing camera images 310 can be considered as gaze directions as described above. In addition, visual target positions are estimated on the basis of the viewer positions and the gazes that have been estimated (S211). In the system 10 in the example illustrated in FIG. 8, information about the visual target positions estimated by the viewer terminals 400 and the outward-facing camera images 310 acquired by the cameras 300 are uploaded to the server 500 (S213). As described above, the process in S201 to S211 may be performed in the server 500. In this case, only the upload of the outward-facing camera images 310 (inward-facing camera images 320, in addition) from the cameras 300 to the server 500 may be performed.

In the server 500, the spatial rating estimation unit 520 calculates density of the visual target positions in a grid or a cluster in the space on the basis of the uploaded information (S215). In the illustrated example, the density of the visual target positions corresponds to the spatial ratings in the grid or the cluster. In addition, the point cloud generation unit 540 in the server 500 determines whether the density exceeds a threshold (S219) in a loop process for each grid or cluster in which the density of the visual target positions has been calculated (S217). In the case where the density exceeds the threshold, point cloud data of the grid or the cluster is generated (S221). The point cloud data generated through the above described process is delivered to a user (S223), and a free-viewpoint image is generated (S227) in accordance with a viewpoint selected by the user (S225).

(5. Hardware Configuration)

Figure 10:
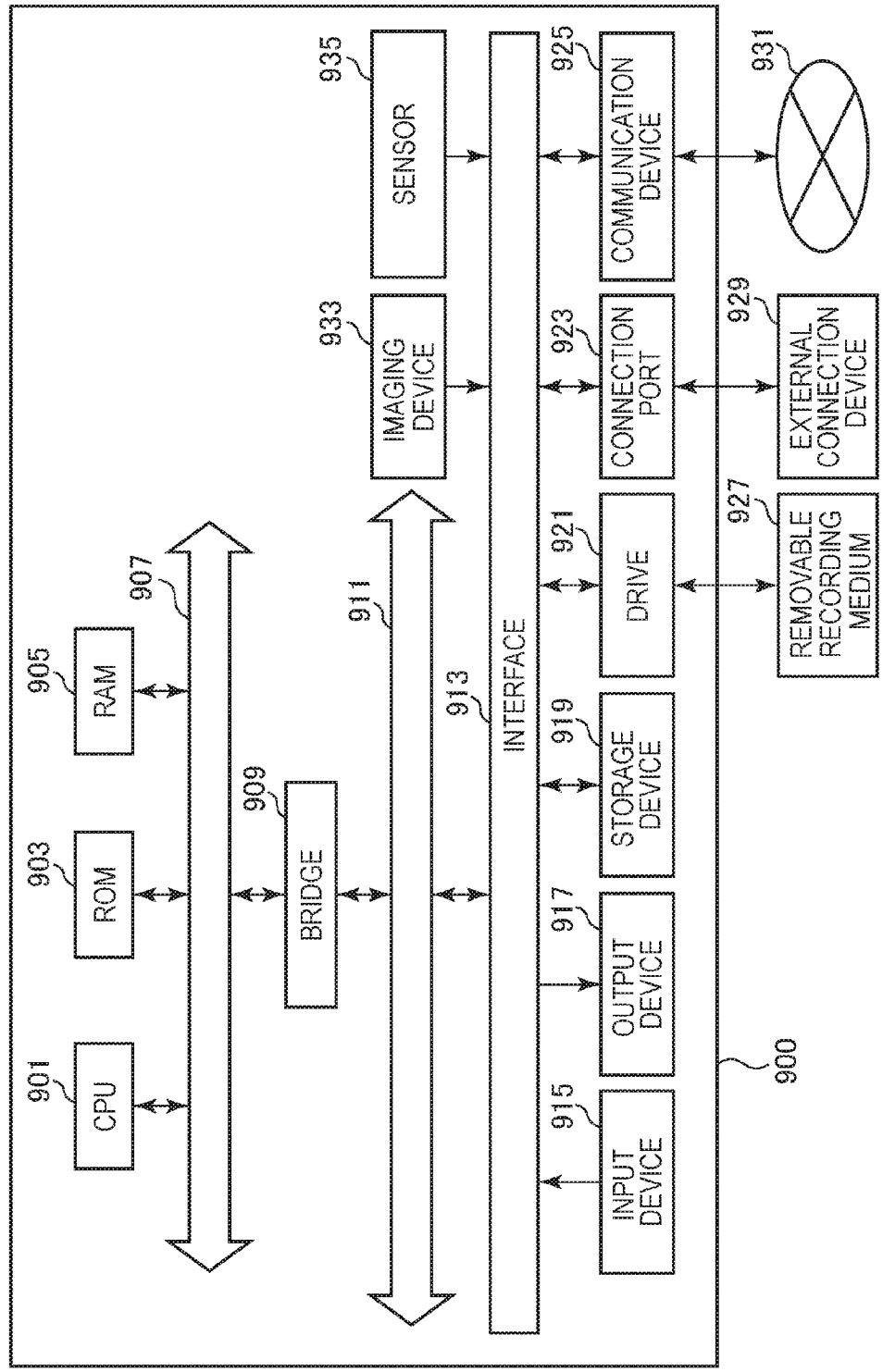
FIG. 10 is a block diagram illustrating a hardware configuration example of an information processing device according to an embodiment of the present disclosure.

Next, with reference to FIG. 10, a hardware configuration of an information processing device according to an embodiment of the present disclosure is explained. FIG. 10 is a block diagram illustrating a hardware configuration example of an information processing device according to the embodiment of the present disclosure. The illustrated information processing device 900 may implement the viewer terminal, the server terminal, and/or the user terminal in the above described embodiment.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 constituted by an internal bus such as a CPU bus or the like. The host bus 907 is connected with the external bus 911 such as a Peripheral Component Interconnect/Interface (PCI) bus via the bridge 909.

The input device 915 is a device operated by a user such as a mouse, a keyboard, a touch screen, a button, a switch, and a lever. The input device 915 may be a remote control device that uses, for example, infrared radiation and another type of radio waves. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. A user inputs various types of data and indicates a processing operation to the information processing device 900 by operating the input device 915.

The output device 917 includes a device that can report acquired information to a user visually, audibly, or haptically. The output device 917 may be, for example, a display device such as a liquid crystal display (LCD) or an organic electro-luminescence (EL) display, an audio output device such as a speaker or a headphone, or a vibrator. The output device 917 outputs a result obtained through a process performed by the information processing device 900, in the form of text, video such as an image, sounds such as voice and audio sounds, or vibration.

The storage device 919 is a device for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various data to be executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to connect devices with the information processing device 900. The connection port 923 may be a Universal Serial Bus (USB) port, an IEEE1394 port, and a Small Computer System Interface (SCSI) port. In addition, the connection port 923 may be an RS-232C port, an optical audio terminal, a High-Definition Multimedia Interface (HDMI) (registered trademark) port, or the like. The connection of the external connection device 929 with the connection port 923 makes it possible to exchange various types of data between the information processing device 900 and the external connection device 929.

The communication device 925 is a communication interface including, for example, a communication device for connection with a communication network 931. The communication device 925 may be, for example, a communication card for a local area network (LAN), Bluetooth (registered trademark), Wi-Fi, or a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits and receives signals to and from another communication device by using a predetermined protocol such as TCP/IP. The communication network 931 to which the communication device 925 connects is a network established through wired or wireless connection. The communication network 931 may include, for example, the Internet, a home LAN, infrared communication, radio communication, or satellite communication.

The imaging device 933 is a device that captures images of a real space by using an image sensor such as a charge coupled device (CCD) and a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing device 900 such as an attitude of a housing of the information processing device 900, and information regarding an environment surrounding the information processing device 900 such as luminous intensity and noise around the information processing device 900. The sensor 935 may include a Global Navigation Satellite System (GNSS) receiver that receives signals from an artificial satellite to measure latitude, longitude, and altitude of the device.

The example of the hardware configuration of the information processing device 900 has been described above. Each of the structural elements described above may be configured by using a general purpose component or may be configured by hardware specialized for the function of each of the structural elements. The configuration may be changed as necessary in accordance with the state of the art at the time of working of the present disclosure.

(6. Supplement)

The embodiments of the present disclosure may include, for example, the above-described information processing device, the above-described system, an information processing method executed by the information processing device or the system, a program for causing the information processing device to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above described embodiment, the evaluation result (spatial ratings) of positions in the space according to the density of the visual target positions is used for generating the point cloud data for providing the free-viewpoint image. However, the embodiment of the present disclosure is not limited thereto. For example, a position with high spatial ratings is estimated as a position that a user viewing captured images is interested in very mush. Therefore, various processes for recording images in accordance with the user's interest may be performed in accordance with the spatial ratings.

More specifically, for example, an image capturing a position with high spatial ratings is recorded at high quality (large image size and/or high bit rate), and an image capturing a position without high spatial ratings is recorded at low quality (small image size and/or low bit rate). Thereby, resource for recording data is used effectively.

In addition, for example, it is also possible to use available images and simply switch and view a plurality of viewpoint images capturing a position for which data for generating a free-viewpoint image (such as point cloud data) has not been generated, in the case where images sufficient to generate the free-viewpoint image have not been acquired at the position with high spatial ratings, or in the case where a user viewing images designates a position for which data for generating a free-viewpoint image has not been generated due to low spatial ratings.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including
a processor configured to achieve
a function of collecting information indicating visual target positions from a plurality of viewpoints existing in a space, and
a function of evaluating positions in the space in accordance with density of the visual target positions.

(2)
The information processing device according to (1),
wherein the processor further achieves
a function of acquiring image data that is obtained by imaging an inside of the space, and
a function of editing the image data on the basis of a result of evaluating the positions in the space.

(3)
The information processing device according to (2),
wherein the edit on the image data includes generation of data for providing a free-viewpoint image.

(4)
The information processing device according to (3),
wherein the edit on the image data includes generation of data for selectively providing the free-viewpoint image in accordance with the density of the visual target positions.

(5)
The information processing device according to any one of (2) to (4),
wherein the edit on the image data includes change in quality of the image data to be recorded in accordance with the density of the visual target positions.

(6)
The information processing device according to any one of (2) to (5),
wherein the edit on the image data includes selection of the image data to be recorded in accordance with the density of the visual target positions.

(7)
The information processing device according to any one of (2) to (6),
wherein the visual target positions are estimated on the basis of the image data.

(8)
The information processing device according to any one of (1) to (7),
wherein the processor further achieves
a function of acquiring image data that is obtained by imaging an inside of the space, and
a function of controlling the acquisition of the image data on the basis of a result of evaluating the positions in the space.

(9)
The information processing device according to (8),
wherein the control over the acquisition of the image data includes control over a target position of the imaging.

(10)
The information processing device according to (8) or (9),
wherein the control over the acquisition of the image data includes control over a target range of the imaging.

(11)
The information processing device according to (1),
wherein the visual target positions are estimated on the basis of the image data obtained by imaging the inside of the space from the plurality of viewpoints.

(12)
The information processing device according to (11),
wherein the processor further achieves
a function of estimating the visual target positions on the basis of information indicating the visual target positions.

(13)
The information processing device according to (12),
wherein the information indicating the visual target positions includes the image data.

(14)
The information processing device according to (12),
wherein the information indicating the visual target positions includes information indicating positions of the plurality of viewpoints estimated on the basis of the image data.

(15)
The information processing device according to (14),
wherein the information indicating the visual target positions further includes information indicating gazes from the plurality of viewpoints.

(16)
The information processing device according to any one of (1) to (15),
wherein the density of the visual target positions is evaluated for each grid set in the space.

(17)
The information processing device according to any one of (1) to (15),
wherein the density of the visual target positions is evaluated for each cluster including the visual target positions that are close to each other.

(18)
An information processing method including
collecting information indicating visual target positions from a plurality of viewpoints existing in a space, and
evaluating, by a processor, positions in the space in accordance with density of the visual target positions.

(19)
A program causing a processor to achieve:
a function of collecting information indicating visual target positions from a plurality of viewpoints existing in a space; and
a function of evaluating positions in the space in accordance with density of the visual target positions.

REFERENCE SIGNS LIST

10 system
300 camera
400 viewer terminal
500 server
510 visual target position data
520 spatial rating estimation unit
530 image data
540 point cloud generation unit
600 user terminal
610 free-viewpoint-image generation unit

The invention claimed is:

1. An information processing device, comprising:
a processor configured to:
collect information indicating a plurality of visual target positions from a plurality of viewpoints, wherein the plurality of viewpoints are in a space;
evaluate a plurality of positions in the space based on density of the plurality of visual target positions;
control an image sensor to obtain image data, wherein the image sensor obtains the image data based on an imaging operation on an inside of the space;
acquire the image data from the image sensor;
edit the image data based on the evaluated plurality of positions in the space; and
generate, based on the edited image data, free-viewpoint image data to provide a free viewpoint image.

2. The information processing device according to claim 1, wherein processor is further configured to generate the free-viewpoint image data based on the density of the plurality of visual target positions.

3. The information processing device according to claim 1, further comprises a memory,
wherein the edited image data includes change in quality of the image data, and
wherein the memory is configured to record the change in quality of the image data based on the density of the plurality of visual target positions.

4. The information processing device according to claim 1, further comprises a memory,
wherein the edited image data includes selection of the image data, and
wherein the memory is configured to record the selection of the image data based on the density of the plurality of visual target positions.

5. The information processing device according to claim 1, wherein the processor is further configured to estimate the plurality of visual target positions based on the image data.

6. The information processing device according to claim 1, wherein the processor is further configured to
control the image sensor for the acquisition of the image data based on the evaluated plurality of positions in the space.

7. The information processing device according to claim 6, wherein the processor is further configured to control the image sensor for the acquisition of the image data based on a target imaging position, and wherein the target imaging position corresponds to the image data.

8. The information processing device according to claim 6, wherein the processor is further configured to control the image sensor for the acquisition of the image data based on a target imaging range, and wherein the target imaging range corresponds to the image data.

9. The information processing device according to claim 1, wherein the processor is further configured to:
control the image sensor to obtain the image data from the plurality of viewpoints; and
estimate the plurality of visual target positions based on the image data.

10. The information processing device according to claim 9, wherein the processor is further configured to estimate the plurality of visual target positions based on information indicating the plurality of visual target positions.

11. The information processing device according to claim 10, wherein the information indicating the plurality of visual target positions include the image data.

12. The information processing device according to claim 10, wherein the information indicates the plurality of visual target positions, and wherein the information includes a plurality of positions of the plurality of estimated viewpoints.

13. The information processing device according to claim 12, wherein the information further includes gazes from the plurality of viewpoints.

14. The information processing device according to claim 1, wherein the processor is further configured to evaluate the density of the plurality of visual target positions for each grid set in the space.

15. The information processing device according to claim 1,
wherein the processor is further configured to evaluate the density of the plurality of visual target positions for each cluster of a plurality of clusters, and
wherein the each cluster includes the plurality of visual target positions that are close to each other.

16. An information processing method, comprising:
in an information processing device that comprises a processor:
collecting, by the processor, information indicating a plurality of visual target positions from a plurality of viewpoints, wherein the plurality of viewpoints are in a space;
evaluating, by the processor, a plurality of positions in the space based on density of the plurality of visual target positions;
controlling an image sensor to obtain image data, wherein the image sensor obtains the image data based on imaging on an inside of the space;
acquiring the image data from the image sensor;
editing, by the processor, the image data based on the evaluated plurality of positions in the space; and
generating, by the processor, free-viewpoint image data based on the edited image data to provide a free viewpoint image.

17. A non-transitory computer-readable medium having stored thereon computer-readable instructions which, when executed by a computer, cause the computer to execute operations, the operations comprising:
collecting information indicating a plurality of visual target positions from a plurality of viewpoints, wherein the plurality of viewpoints are in a space;
evaluating a plurality of positions in the space based on density of the plurality of visual target positions;
controlling an image sensor to obtain image data, wherein the image sensor obtains the image data based on imaging on an inside of the space;
acquiring the image data from the image sensor;
editing the image data based on the evaluated plurality of positions in the space; and
generating, based on the edited image data, free-viewpoint image data to provide a free viewpoint image.

* * * * *